United States Patent
Snapp

(10) Patent No.: US 9,426,633 B2
(45) Date of Patent: Aug. 23, 2016

(54) SYSTEM AND METHOD FOR TREATING A SPECIAL NUMBER SERVICE REQUEST MESSAGE SENT TO A SPECIAL NUMBER SERVICE ANSWERING POSITION USING A MULTI-MEDIA MESSAGING SERVICE FORMAT

(71) Applicant: West Corporation, Omaha, NE (US)

(72) Inventor: John Lawrence Snapp, Westminster, CO (US)

(73) Assignee: West Corporation, Omaha, NE (US)

(*) Notice: Subject to any disclaimer, the term of this patent is extended or adjusted under 35 U.S.C. 154(b) by 0 days.

(21) Appl. No.: 14/659,877

(22) Filed: Mar. 17, 2015

(65) Prior Publication Data
US 2015/0189680 A1    Jul. 2, 2015

Related U.S. Application Data

(63) Continuation-in-part of application No. 13/598,286, filed on Aug. 29, 2012, now abandoned.

(60) Provisional application No. 61/594,554, filed on Feb. 3, 2012.

(51) Int. Cl.
| | |
|---|---|
| *H04W 76/00* | (2009.01) |
| *H04W 4/12* | (2009.01) |
| *H04W 4/22* | (2009.01) |
| *H04W 4/14* | (2009.01) |
| *H04L 29/06* | (2006.01) |
| *H04M 3/51* | (2006.01) |

(52) U.S. Cl.
CPC ............... *H04W 4/12* (2013.01); *H04L 65/601* (2013.01); *H04W 4/14* (2013.01); *H04W 4/22* (2013.01); *H04M 3/5116* (2013.01); *H04W 76/007* (2013.01)

(58) Field of Classification Search
CPC ....... H04W 76/007; H04W 4/12; H04W 4/22; H04M 3/5116; H04M 3/5125; H04M 2242/04
USPC .................... 455/404.1, 404.2, 466
See application file for complete search history.

(56) References Cited

U.S. PATENT DOCUMENTS

| | | | |
|---|---|---|---|
| 7,719,414 B1* | 5/2010 | Smith .................... | G06F 19/327 340/286.01 |
| 2004/0249864 A1* | 12/2004 | Laumen ................. | H04M 19/04 |
| 2012/0320912 A1* | 12/2012 | Estrada .................. | H04M 11/04 370/389 |

* cited by examiner

*Primary Examiner* — Vladimir Magloire
*Assistant Examiner* — Erica Navar
(74) *Attorney, Agent, or Firm* — Neil Ostroff

(57) ABSTRACT

A method for treating an emergency service request message sent by a requesting station to an emergency service answering position; the method includes: (a) receiving the emergency service request message in a multi-media messaging service (MMS) format wherein the emergency service request message includes a requesting station address and a timestamp; (b) separating the text portions from the media portions in the emergency service request message; (c) creating a single media identifier to effect correlating the media portions with the text portions; (d) formatting the text portions with the media identifier in a text message; (e) forwarding the text message toward the emergency service answering position; and (f) employing the media identifier to correlate the media portions with the text portions.

10 Claims, 2 Drawing Sheets

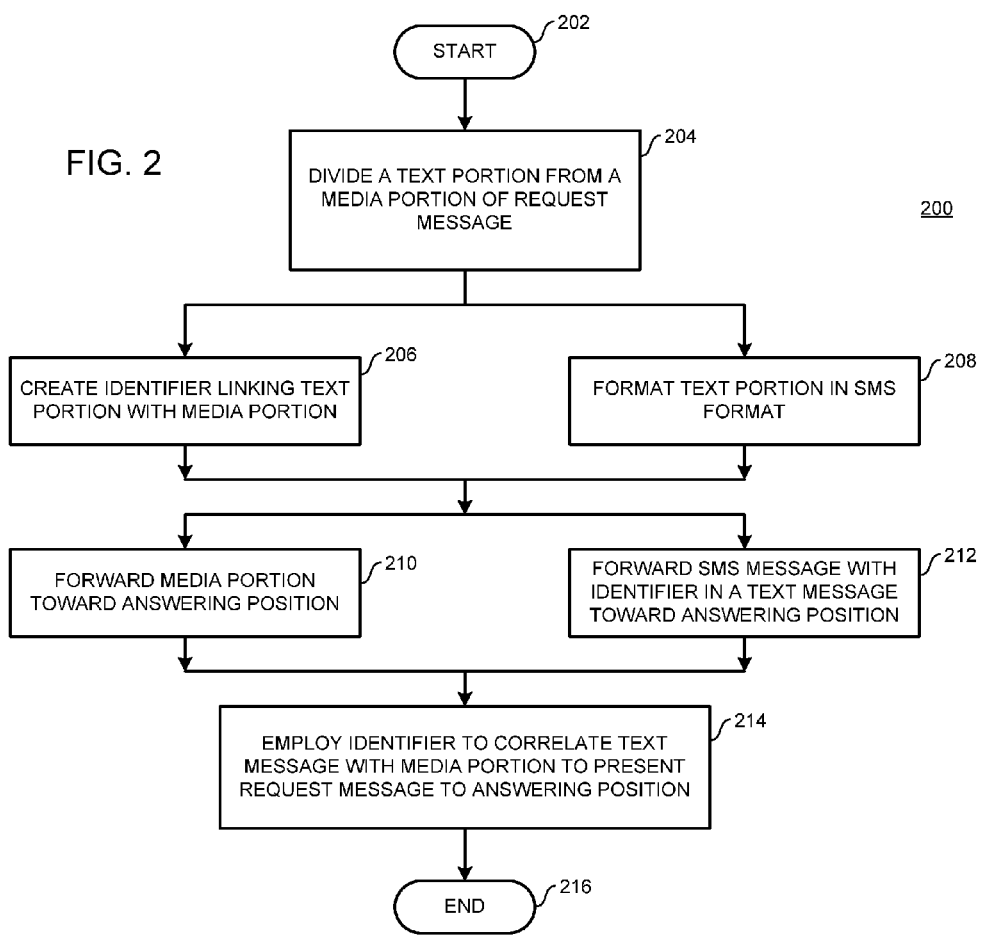

SYSTEM AND METHOD FOR TREATING A SPECIAL NUMBER SERVICE REQUEST MESSAGE SENT TO A SPECIAL NUMBER SERVICE ANSWERING POSITION USING A MULTI-MEDIA MESSAGING SERVICE FORMAT

FIELD OF THE INVENTION

The present invention is directed to telecommunication systems, and especially to handling special number calls, such as emergency service calls, originated in a Multi-media Messaging Service (MMS) format.

BACKGROUND OF THE INVENTION

Users of mobile or telephones or other wireless communication devices including, by way of example and not by way of limitation, Personal Digital Assistant (PDA) devices, "Smart" phones, automatic crash notification (ACN) units, mobile radio devices and similar communication devices may be capable of employing Multi-media Messaging Service (MMS) format for carrying out communications. Such MMS format messaging may be employed by a user in carrying out communications related with special number calls.

Examples of such special number calls are 9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

Some special number answering positions may not be equipped for handling MMS format messaging.

There is a need for a system and method for treating a special number call sent to a special number answering position, such as an emergency service request message sent to an emergency service answering position, using a Multi-media Messaging Service (MMS) format.

SUMMARY OF THE INVENTION

A method for treating an emergency service request message sent by a requesting station to an emergency service answering position; the method includes: (a) receiving the emergency service request message in a multi-media messaging service (MMS) format wherein the emergency service request message includes a requesting station address and a timestamp; (b) separating the text portions from the media portions in the emergency service request message; (c) creating a single media identifier to effect correlating the media portions with the text portions; (d) formatting the text portions with the media identifier in a text message; (e) forwarding the text message toward the emergency service answering position; and (f) employing the media identifier to correlate the media portions with the text portions.

A system for treating a special number service request message sent using a multi-media messaging service (MMS) format; the system includes: (a) a requesting station; (b) a special number service request answering position coupled with the requesting station; and (c) a segmenting facility coupled with the requesting station and coupled with the special number service request answering position; the segmenting facility receiving the special number service request message from the requesting station wherein the special number service request message includes a requesting station address and a timestamp; the segmenting facility configured to perform steps comprising: (i) separating all text portions from all media portions in the special number service request message; (ii) creating a set of media identifiers to effect correlating the media portions with the text portions wherein each media identifier in the set of media identifiers is associated with a unique media portion; (iii) formatting the text portions and the set of media identifiers in a text message; and (iv) forwarding the text message toward the special number service request answering position.

It is, therefore, a feature of the present invention to provide a system and method for treating a special number call sent to a special number answering position, such as an emergency service request message sent to an emergency service answering position, using a Multi-media Messaging Service (MMS) format.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 2 is a flow diagram illustrating the method of the present invention.

DETAILED DESCRIPTION

Figure 1:
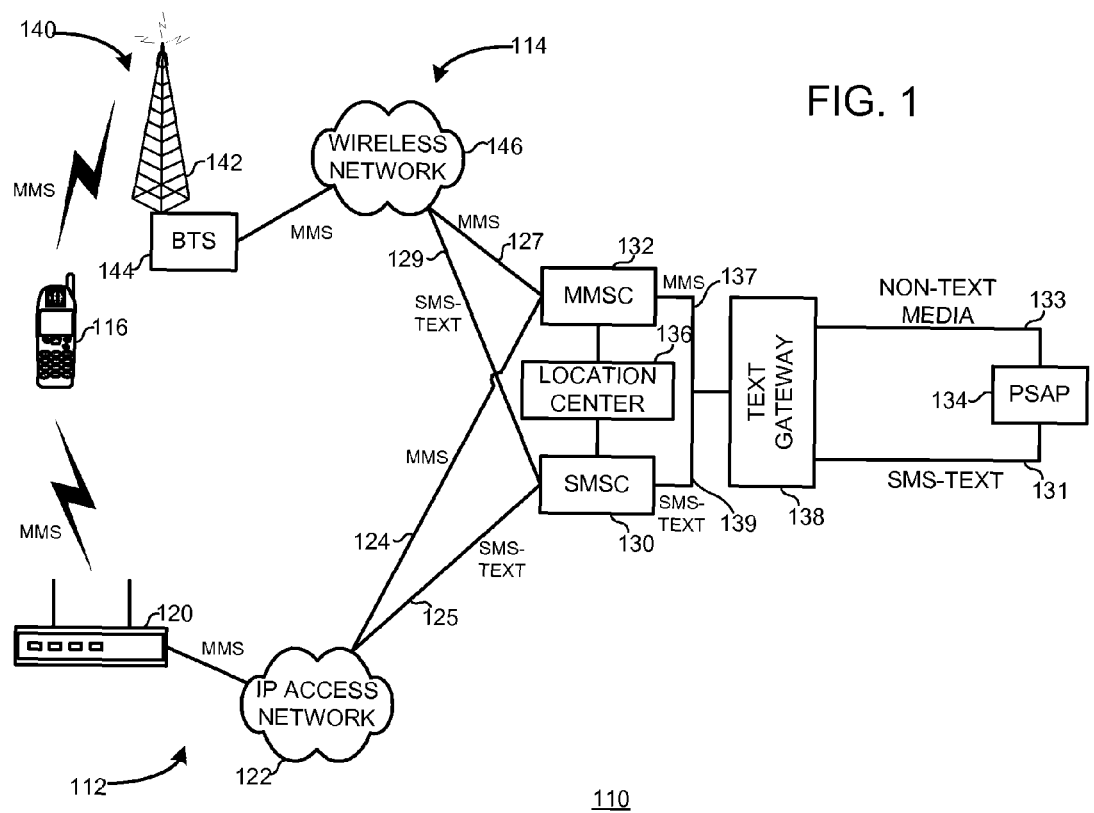
FIG. 1 is a schematic illustration of a system for effecting the present invention.

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

FIG. 1 is a schematic illustration of an embodiment of the present invention. In FIG. 1, a telecommunication system 110 includes an Unlicensed Mobile Access (UMA) Network (UMAN) 112 and a Radio Access Network (RAN) 114. UMAN 112 may be embodied in, by way of example and not by way of limitation, a Wi-Fi network, a Bluetooth network or another type of UMA. RAN 114 may be embodied in, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 112 and RAN 114 are configured for wireless communication with a wireless calling unit or instrument 116. Wireless calling unit 116 may be embodied in a wireless calling device including, by way of example and not by way of limitation, mobile telephone, Personal Digital Assistant (PDA) devices, "Smart" phones, automatic crash notification (ACN) units, mobile radio devices and similar communication devices.

UMAN 112 includes an access unit 120 coupled with an Internet Protocol (IP) access network 122. Access unit 120 facilitates communication between wireless communicating unit 116 and IP network 122. IP network 122 is coupled with a Short Messaging Service Center (SMSC) 130 and with a Multimedia Messaging Service Center (MMSC) 131. Short Messaging System (SMS) messages are conveyed from IP network 122 to SMSC 130 via a line 125. Text messaging formats other than SMS messages may also be accommodated by system 110. Multimedia Messaging Service (MMS) messages are conveyed from IP network 122 to MMSC 131 via a line 124.

RAN 114 includes an access unit 140 that includes a radio antenna embodied in a radio tower 142 and a Base Transceiver Station (BTS) 144 coupled with radio tower 142. BTS 144 is coupled with a private network 146. Private network 146 may be embodied in, by way of example and not by way of limitation, a cellular network or a PCS network employing any of several communication protocols including, by way of further example and not by way of limitation, GSM or another protocol using Time Division Multiple Access (TDMA), Code Division Multiple Access (CDMA) or another coding scheme. Access unit 140 facilitates communication between wireless communicating unit 116 and private network 146. Private network 146 is coupled with SMSC 130 and with MMSC 131. SMS messages are conveyed from private network 146 to SMSC 130 via a line 129. MMS messages are conveyed from private network 146 to MMSC 131 via a line 127.

SMSC 130 and MMSC 131 are coupled with a location center 136 and with a text gateway 138. Text gateway 138 is coupled with a Public Safety Answering Point (PSAP; sometimes referred to as a Public Safety Answering Position) 134. Non-text media messages are conveyed from text gateway 138 to PSAP 134 via a communication line 133. SMS-TEXT messages are conveyed to PSAP 134 via a communication line 131.

Calling unit 116 may wirelessly access UMAN 112 to place an emergency 9-1-1 call via access unit 120 to establish communication with PSAP 134 via IP network 122. The 9-1-1 message may be in the form of a multimedia message such as, by way of example and not by way of limitation, a photograph with accompanying text reading, "This person just ran their car into mine and drove away."

The 9-1-1 multimedia message (by way of example and not by way of limitation, a photograph plus text) may be conveyed from IP network 122 in MMS format via line 124 to MMSC 132 as indicated by the notation MMS between IP network 122 and MMSC 132. The MMS message may be further conveyed from MMSC 132 via line 137 to text gateway 138 as indicated by the notation MMS between MMSC 132 and text gateway 138. Any SMS-TEXT messaging not included in an MMS message may be conveyed from IP network 122 to text gateway 138 via line 125 to SMSC 130, as indicated by the SMS-TEXT notation between IP network 122 and SMSC 130, and thence via a line 139 to text gateway 138, as indicated by the SMS-TEXT notation between SMSC 130 and text gateway 138.

In an alternative embodiment, calling unit 116 may instead wirelessly access RAN 114 to place an emergency 9-1-1 call via BTS 144 to establish communication with PSAP 134 via private network 146. The 9-1-1 message may be in the form of a multimedia message such as, by way of example and not by way of limitation, a photograph with accompanying text reading, "This person just ran their car into mine and drove away."

The 9-1-1 multimedia message (by way of example and not by way of limitation, a photograph plus text) may be conveyed from private network 146 in MMS format via line 127 to MMSC 132 as indicated by the notation MMS between private network 146 and MMSC 132. The MMS message may be further conveyed from MMSC 132 via line 137 to text gateway 138 as indicated by the notation MMS between MMSC 132 and text gateway 138. Any SMS-TEXT messaging not included in an MMS message may be conveyed from private network 146 to text gateway 138 via line 129 to SMSC 130, as indicated by the SMS-TEXT notation between private network 146 and SMSC 130, and thence via a line 139 to text gateway 138, as indicated by the SMS-TEXT notation between SMSC 130 and text gateway 138.

Text gateway 138 separates all text portions from all media portions in the MMS message received via line 137, including the subject header if present. If there are no text portions in the MMS message received via line 137, a preconfigured text portion is used. By way of example and not by way of limitation, the preconfigured text portion is "MMS received with no text, only media." In the preferred embodiment, text gateway 138 creates a single media identifier to effect correlating media portions in the MMS message with text portions in the MMS message. The media identifier includes the requesting station address and timestamp as received in the MMS message. Preferably, the requesting station address is the sender's MSISDN. In an alternative embodiment, text gateway 138 creates a set of media identifiers, one per media portion, to effect correlating media portions in the MMS message with text portions in the MMS message. In this alternative embodiment (where each media portion has a separate media identifier), the media identifier includes the requesting station address, timestamp, a sequential media portion index number and content information, where the content information identifies the type of media content—either audio, video or image. In this alternative embodiment, PSAP 134 is able to identify individual media portions. One way to understand the difference between these two embodiments is to consider an electronic photo album. In the preferred embodiment, there is one media identifier for the entire photo album. In the alternative embodiment, there is one media identifier for each picture—in essence, the set of media identifiers creates an index to each picture in the photo album.

Text gateway 138 includes the media identifier(s) into the SMS-TEXT portion. Media portions are conveyed to PSAP 134 via line 133. SMS-TEXT portions are conveyed to PSAP via line 131. The presence of a media identifier in the extant text message advises PSAP 134 that media content accompanies the extant text message. SMS-TEXT messaging received by text gateway 138 from line 139 is conveyed to PSAP 134 via line 131.

After receiving the text portion of the MMS messaging PSAP 134 may preferably reply via SMS communications because SMS communications are typically faster than MMS communications. The media portion of the MMS messaging (e.g., the photograph) may be viewed separately by operators at PSAP 134.

FIG. 2 is a flow diagram illustrating the method of the present invention. In FIG. 2, a method 200 for treating a special number service request message sent to a special number service answering position using a multi-media messaging service (MMS) format begins at a START locus 202.

Method 200 continues with, at a locus en route the special number service answering position, separating a text portion of the special number service request message from a media portion of the special number service request message, as indicated by a block 204.

Method 200 continues with, in no particular order: (1) creating an identifier linking the text portion with the media portion, as indicated by a block 206; and (2) formatting the text portion in a short message service (SMS) format, as indicated by a block 208.

Method 200 continues with, in no particular order: (1) forwarding the media portion toward the special number service answering position, as indicated by a block 210; and (2) forwarding the SMS message format with the identifier in a text message toward the special number service answering position, as indicated by a block 212.

Method 200 continues with employing the identifier to effect correlating the text message with the media portion to present the special number service request message to the special number service answering position, as indicated by a block 214. Method 200 terminates at an END locus 216.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A method for treating an emergency service request message sent by a requesting station to an emergency service answering position; the method comprising:
   (a) receiving said emergency service request message in a multi-media messaging service (MMS) format, wherein said emergency service request message comprises a requesting station address and a timestamp;
   (b) separating all text portions from all media portions in said emergency service request message;
   (c) creating a set of media identifiers to effect correlating said media portions with said text portions, wherein each media identifier in said set of media identifiers is associated with a unique media portion and wherein said media identifier comprises said requesting station address, said timestamp, a sequential media portion index number and content information, said content information selected from the group consisting of audio, video, and image;
   (d) formatting said text portions and said set of media identifiers in a text message;
   (e) forwarding said text message toward said emergency service answering position; and
   (f) employing said media identifiers to correlate said media portions with said text portions.

2. The method for treating an emergency service request message sent by a requesting station to an emergency service answering position as recited in claim 1 wherein said correlation of said media portions with said text portions is effected at said emergency service answering position.

3. The method for treating an emergency service request message sent by a requesting station to an emergency service answering position as recited in claim 1 wherein said text portions and said media portions are presented at said emergency service answering position.

4. The method for treating an emergency service request message sent by a requesting station to an emergency service answering position as recited in claim 1 wherein said text portions include the subject header as received in the emergency service request message.

5. The method for treating an emergency service request message sent by a requesting station to an emergency service answering position as recited in claim 1 wherein a preconfigured text portion is used when no text portion is present in the emergency service request message.

6. A system for treating a special number service request message sent using a multi-media messaging service (MMS) format; the system comprising:
   (a) a requesting station;
   (b) a special number service request answering position coupled with said requesting station; and
   (c) a segmenting facility coupled with said requesting station and coupled with said special number service request answering position; said segmenting facility receiving said special number service request message from said requesting station, wherein said special number service request message comprises a requesting station address and a timestamp; said segmenting facility configured to perform steps comprising:
      (i) separating all text portions from all media portions in said special number service request message;
      (ii) creating a set of media identifiers to effect correlating said media portions with said text portions, wherein each media identifier in said set of media identifiers is associated with a unique media portion and wherein said media identifiers created by said segmenting facility comprises said requesting station address, said timestamp, a sequential media portion index number and content information, said content information selected from the group consisting of audio, video, and image;
      (iii) formatting said text portions and said set of media identifiers in a text message; and
      (iv) forwarding said text message toward said special number service request answering position.

7. The system for treating a special number service request message sent using a multi-media messaging service (MMS) format as recited in claim 6 wherein said segmenting facility is associated with a mobile switching center.

8. The system for treating a special number service request message sent using a multi-media messaging service (MMS) format as recited in claim 6 wherein said correlation is effected at said special number service answering position.

9. The system for treating a special number service request message sent using a multi-media messaging service (MMS) format as recited in claim 6 wherein said segmenting facility is further configured to insert the subject header from the special number service request message in said text portions.

10. The system for treating a special number service request message sent using a multi-media messaging service (MMS) format as recited in claim 6 wherein said segmenting facility is further configured to insert a preconfigured text portion in said text portions when no text portions are present in the special number service request message.

* * * * *